Dec. 5, 1950 A. B. POOLE ET AL 2,532,569
AUTOMATIC ELECTRIC TOASTER AND THE LIKE
Filed Jan. 29, 1948 2 Sheets-Sheet 1
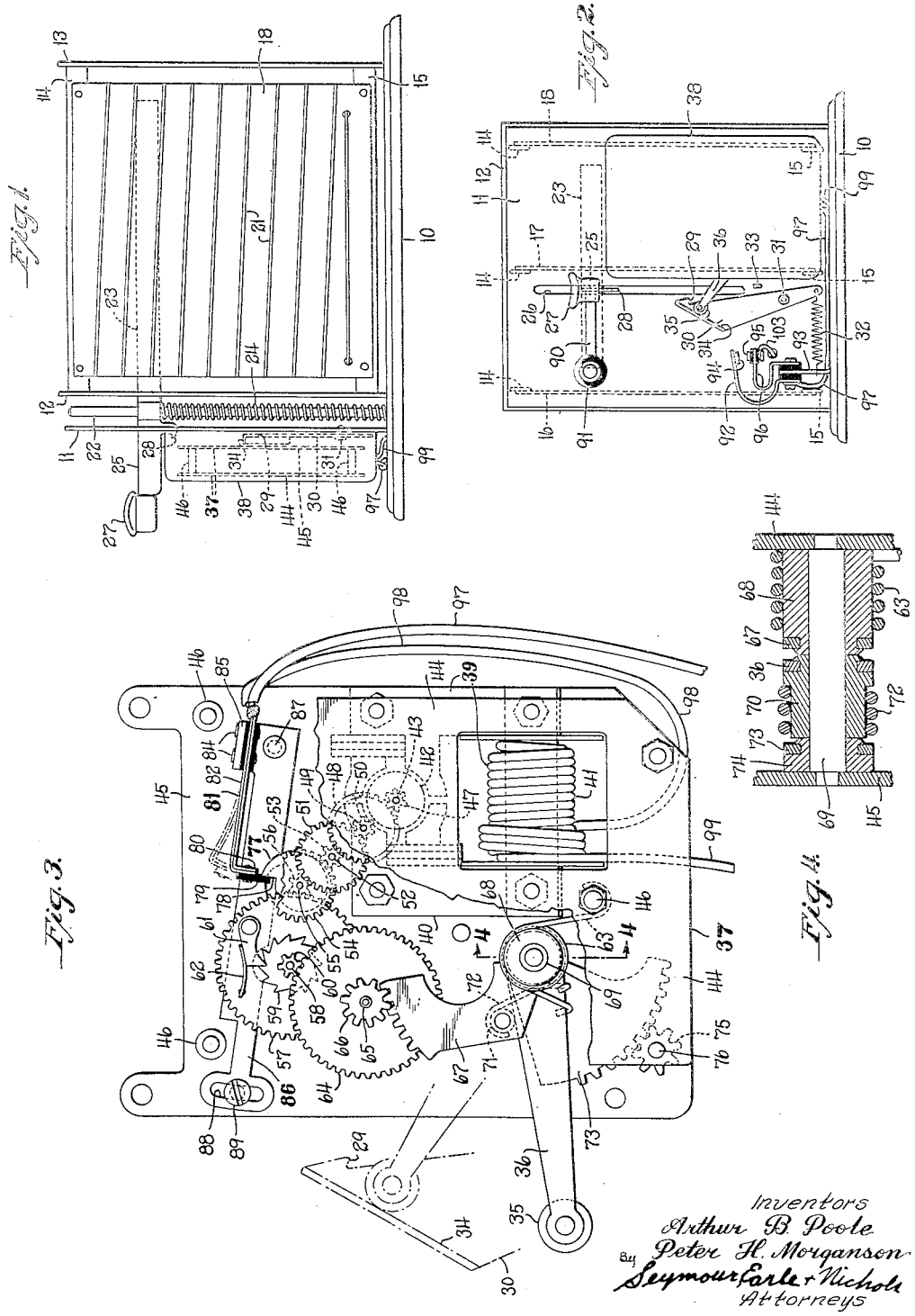
Inventors
Arthur B. Poole
Peter H. Morganson
By Seymour Earle & Nichols
Attorneys Dec. 5, 1950 A. B. POOLE ET AL 2,532,569
AUTOMATIC ELECTRIC TOASTER AND THE LIKE
Filed Jan. 29, 1948 2 Sheets-Sheet 2

Inventors
Arthur B. Poole
Peter H. Morganson
By
Seymour, Earle & Nichols
Attorneys Patented Dec. 5, 1950

2,532,569

UNITED STATES PATENT OFFICE 2,532,569

AUTOMATIC ELECTRIC TOASTER AND THE LIKE

Arthur B. Poole, Harwinton, and Peter H. Morganson, Winsted, Conn., assignors to The William L. Gilbert Clock Corporation, Winsted, Conn., a corporation of Connecticut Application January 29, 1948, Serial No. 4,988

2 Claims. (Cl. 99—333)

The present invention relates to improvements in toasters and the like and relates more particularly to improvements in toasters and the like which are electrically heated and controlled by an automatic timing-device.

One of the objects of the present invention is to provide a superior automatic electrically-heated toaster or the like having a timing-device governing the duration of the heating cycle, and which is provided with simple and reliable means whereby the effectiveness of the timing-device is delayed until such time as the toaster or the like has reached substantially its normal operating temperature.

Another object of the present invention is to provide a toaster or the like of the general character above referred to and having simple, reliable and effective means whereby when the toaster or the like is first put into operation (cold start), the effectiveness of its initial heating cycle will not be materially different from the effectiveness of subsequent heating cycles (hot start).

A further object of the present invention is to provide a superior automatic electrically-heated toaster or the like having a timing-device for governing the duration of the heating cycle, together with simple and reliable means whereby the start of the timing cycle of the said timing-device will be delayed until such time as the toaster or the like has reached substantially its normal operating temperature, to thereby provide heating cycles which are substantially uniform.

Still another object of the present invention is to provide a superior toaster or the like of the general character referred to, in which a synchronous electric motor-drive is employed for the timing-device, in conjunction with a heat-distortable member constructed and arranged to delay the effectiveness of the timing-device, for the purposes described, and which heat-distortable member is heated by current flowing directly therethrough to the heating-means.

A further object of the present invention is to provide a superior toaster or the like of the character above referred to and having a synchronous electric drive-motor for its timing-device, together with the heat-distortable means above referred to, and having the parts so constructed and arranged that the energizing-coil of the synchronous electric motor may be formed of conductors of sufficient diameter and ruggedness to withstand not only rough handling but the ravages of expansion and contraction due to heating and cooling of the apparatus.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a schematic view in side elevation of an automatic electric toaster embodying the present invention but shown with the housing omitted for clarity of illustration;

Fig. 2 is a view thereof in front elevation;

Fig. 3 is a view in front elevation of the electrically-controlled timing-device shown with the cover removed and the front movement-plate partly broken away;

Fig. 4 is a broken sectional view taken on the line 4—4 of Fig. 3;

Figure 5:
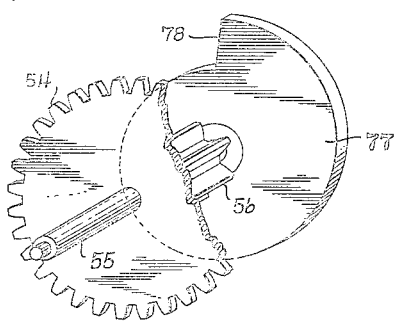
Fig. 5 is a detached perspective view of the unit comprising the fourth-arbor, fourth-pinion, third-gear and retarding-disk, with the said third-gear partly broken away.

The particular automatic electric toaster herein chosen for purposes of illustrating a preferred form of the present invention, includes a base 10 preferably formed of insulating material, and three parallel spaced-apart vertical plates arranged crosswise of the said base 10 and respectively designated as a front plate 11, an intermediate plate 12 and a rear plate 13. The plates 12 and 13 are connected together at their respective upper and lower ends by tie-bars 14 and 15, of which there are three of each.

Figure 7:
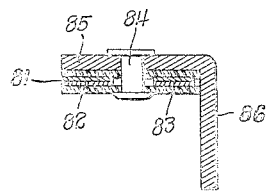
Fig. 7 is a transverse sectional view taken on the line 7—7 of Fig. 6.

Secured to each pair of aligned tie-bars 14 and 15 is one of three parallel coil-holding plates 16, 17 and 18, preferably formed of mica or other suitable heat-resistant insulating material. Each of the said coil-holding plates 16, 17 and 18 above referred to supports and is encircled by one of three heating-coils 19, 20 and 21 which are diagrammatically illustrated in Fig. 7.

Extending upwardly from the base 10 at a point intermediate the front and intermediate plates 11 and 12, is a vertical guide-post 22 (Fig. 1) upon which is mounted with capacity for reciprocation, a food- or toast-holder 23 which, in a manner well understood in the art, extends into the spaces between the adjacent ones of the coil-holding plates 16, 17 and 18 to support slices of bread or other food. The toast-holder 23 is urged upwardly by a helical elevating-spring 24 encircling the lower portion of the guide-post 22 in a position intermediate the base 10 and the underside of the said toast-holder 23.

The toast-holder 23 is provided with a forwardly-extending operating-arm 25 which extends through and is adapted to move vertically in a vertical clearance-slot 26 formed in the central portion of the front plate 11. At its extreme forward end, the said operating-arm 25 is provided with an operating-button or finger-piece 27, by means of which the toast-holder 23 may be depressed against the tension of the elevating-spring 24, in a manner common in the art.

The operating-arm 25 of the toast-holder 23 is formed with a depending latching-hook 28 (Figs. 1 and 2) which is adapted to be hooked under a retirable latching-hook 29 formed upon the upper portion of a pivotal latching-lever 30 which is pivoted intermediate its upper and lower ends to the front face of the front plate 11 by means of a stud 31. The said latching-lever is urged to turn in a clockwise direction (as viewed in Fig. 2) by a latch-spring 32 and is limited in the turning movement just referred to by a stop-finger 33 projecting forwardly from the front plate 11.

The upper side edge of the latching-lever 30 is bent forwardly in an inclined plane to provide a releasing-flange 34 which is adapted to have its underface engaged by an actuating-roller 35. The said actuating-roller is mounted for turning movement on the outer end of an actuating-arm 36 projecting outwardly from a timing-device generally designated by the reference character 37 and mounted against the front of the front plate 11 before referred to. The timing-device 37 may be of any approved design, but in the instance shown corresponds basically to the timing-device shown and described in U. S. Patent No. 2,359,580 dated October 3, 1944 and, hence, does not require a completely detailed description. The said timing-device is illustrated in Figs. 1 and 2 as being substantially enclosed within a housing 38, which housing, however, is shown as removed in Figs. 3 and 8.

The said timing-device 37 includes a synchronous electric motor generally designated by the reference character 39 and is, in effect, a magneto-electric timing-motor. The said motor includes a stator- or field-frame 40 having an energizing-coil 41 of relatively-few turns and relatively-coarse wire such, for instance, as 18 turns of No. 14 wire totaling about 57 inches in length. Located within the zone defined by the pole-salients of the stator-frame 40 is a rotor 42 mounted upon a drive-shaft or first-arbor 43 journaled in any suitable manner at its respective opposite ends in a front movement plate 44 and a rear movement-plate 45. The said movement-plates are held in spaced relationship with respect to each other by a suitable number of pillars 46, indicated in Figs. 1 and 3.

The first-arbor 43, in addition to rigidly mounting the rotor 42, rigidly carries a drive- or first-pinion 47 which meshes into and drives a first-gear 48 rigidly mounted upon a second-arbor 49 which may be suitably supported in the movement-plates 44 and 45. The said second-arbor rigidly carries a second-pinion 50 which, in turn, meshes into and drives a second-gear 51. The said second-gear is rigidly mounted upon a third-arbor 52 which also has rigidly mounted upon it a third-pinion 53, all as indicated in Fig. 3.

The third-pinion 53 above referred to meshes into and drives a third-gear 54 which is rigidly mounted upon a fourth-arbor 55. The said fourth-arbor also rigidly carries a fourth-pinion 56 which meshes into and drives a fourth-gear 57. The said fourth-gear is rigidly mounted upon a fifth-arbor 58 which, like the other arbors, may be conveniently supported in the movement-plates 44 and 45.

The fifth-arbor 58 above referred to also carries, but with freedom for relative rotation with respect thereto, a unit which comprises a ratchet-wheel 59 and a fifth-pinion 60 rigid with the said ratchet-wheel. On its face adjacent the ratchet-wheel 59, the fourth-gear 57 has pivoted thereto a pawl 61, the free end of which is yieldingly urged into engagement with the teeth of the ratchet-wheel 59 by a pawl-spring 62 also carried by the fourth-gear 57. By means of the pawl 61, the ratchet-wheel 59 and the fifth-pinion 60 are prevented from turning in a clockwise direction (Fig. 3) with respect to the fourth-gear 57. It may here be noted that under the particular circumstances as viewed in Fig. 3, the fourth-gear 57 is turned by the rotor 42 in a clockwise direction, while the ratchet-wheel 59 is normally urged to turn in the same direction by means of a torsion-spring 63, in a manner as will be hereinafter described.

The fifth-pinion 60 above referred to meshes into and drives a fifth-gear 64 rigidly mounted upon a sixth-arbor 65 journaled in the movement-plates 44 and 45. Also rigidly mounted upon the sixth-arbor 65 is a sixth- or timing-pinion 66 which is adapted to be meshed into by a timing-rack 67.

The lower end of the timing-rack 67 above referred to is staked or otherwise rigidly attached to one end of a hub 68 which is mounted for turning movement upon a shaft 69, as is particularly well shown in Fig. 4. The said shaft is supported at its respective opposite ends in the movement-plates 44 and 45. Mounted adjacent to and concentric with the timing-rack 67 is the actuating-lever 36 before described, which is staked at its inner end to a hub 70, which latter is also mounted for turning movement upon the shaft 69.

The timing-rack 67 has laterally projecting from it toward the actuating-lever 36 and over the edge thereof, a limiting-stud 71 which is normally held in engagement with the adjacent edge of the actuating-lever 36 by means of a helical torsion-spring 72 encircling the hub 68. The said torsion-spring has one end hooked around the lower edge of the actuating-lever 36 and has its opposite end hooked around the limiting-stud 71, as is indicated in Fig. 3. The said limiting-stud 71 of the timing-rack 67 is adapted to engage with and be stopped by the upper edge of an interval-adjusting rack 73 which has its inner end staked or otherwise rigidly secured to a hub 74 (Fig. 4) mounted for turning movement upon the shaft 69 before referred to.

The interval-adjusting rack 73 is adapted to be turned into various positions of adjustment by means of a setting-pinion 75 rigidly mounted upon a setting-arbor 76 journaled in the movement-plates 44 and 45.

The actuating-lever 36 is yieldingly urged to turn in a clockwise direction (as viewed in Fig. 3) by means of the torsion-spring 63 before referred to. The said torsion-spring encircles the hub 70 carrying the actuating-lever 36 and having one end hooked beneath the lower edge of the said actuating-lever and having its opposite end hooked around the adjacent one of the pillars 46.

As thus constructed and arranged, the torsion-spring 72 normally serves to hold the limiting-stud 71 in engagement with the upper edge of the actuating-lever 36 for concurrent movement therewith, though providing a yielding connection which will permit the said actuating-lever to be turned in a counterclockwise direction relative to the timing-rack 67. The torsion-spring 63 exerts a constant effort to swing the actuating-lever 36 in a clockwise direction and hence also acts through the limiting-stud 71 to tend to swing the timing-rack 67 also in the same direction.

The torsion-spring 63 acting through the actuating-lever 36, limiting-stud 71 and timing-rack 67, tends to turn the timing-pinion 66 in a counterclockwise direction (as viewed in Fig. 3) and hence through the various gears, pinions, etc., exerts some slight but ineffective effort to turn the rotor 42, which latter, however, is synchronously turning and acts in effect as a governor.

The fourth-arbor 55 before described, in addition to rigidly carrying the third-wheel 54 and fourth-pinion 56, also rigidly carries a retarding-disk or retarding-member 77 having a substantially-radial retarding-face 78 and located between the movement-plates 44 and 45.

The retarding-face 78 of the stop-disk 77 is adapted to engage with a retarding-plate 79 preferably formed of insulating material and rigidly mounted upon a finger 80, bent at substantially a right angle from one end of a heat-distortable retarding-member generally designated by the reference character 81 and in the present instance formed of bimetallic material. The material from which the bimetallic retarding-member 81 may be made varies widely and requires no detailed description herein other than to say that its two layers of welded-together metal are respectively of different heat-expansion characteristics, as is well known in the art, such that when heated, the member will distort, for instance, into the position in which it is indicated by broken lines in Fig. 3.

Figure 6:
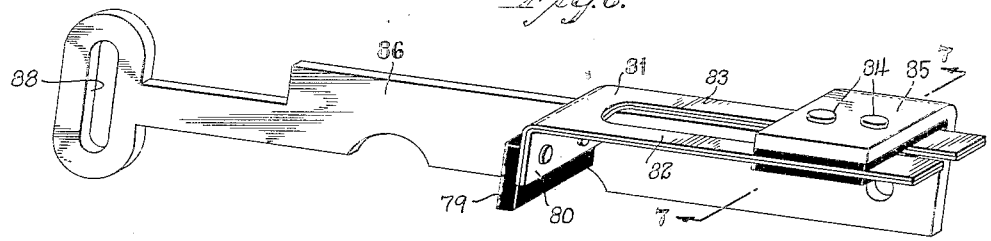
Fig. 6 is a perspective view of the unit comprising the adjusting-arm and bimetallic retarding-member.

The end of the retarding-member 81 opposite its finger 80 is split to provide two laterally-spaced-apart arms 82 and 83 which are both mechanically and electrically integrally connected at the end of the retarding-member adjacent its said finger 80, all as is especially well indicated in Fig. 6.

The free ends of the arms 82 and 83 of the retarding-member 81 are insulated from and rigidly secured by means of rivets 84 or the like to a finger 85 integral with and extending forwardly from a sheet metal adjusting-member generally designated by the reference character 86. At its end adjacent its finger 85, the adjusting-member 86 is pivotally connected to the forward face of the rear movement-plate 45 by means of a stud 87, as is indicated in Fig. 3. At its opposite end, the adjusting-member 86 is formed with a slot 88 through which extends a clamping-screw 89 threaded into the rear movement-plate 45, as is also indicated in Fig. 3.

Figure 8:
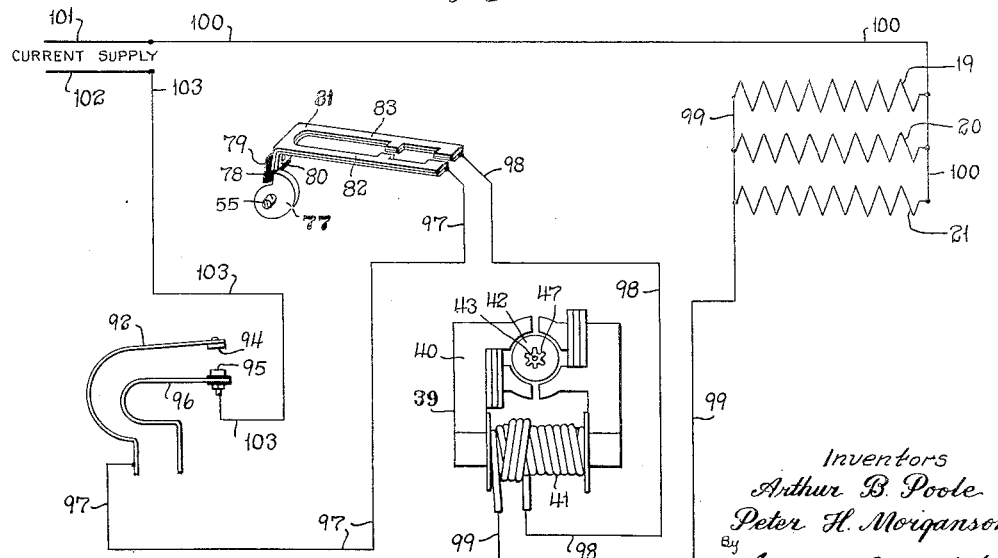
Fig. 8 is a diagrammatic view schematically illustrating the circuit relationships of the heating-coils, synchronous electric motor, retarding-member and electric switch.

Extending laterally from the operating-arm 25 of the toast-holder 23, is a stud 90 carrying at its outer end a roller 91 (Fig. 2) preferably formed of insulating material. The said roller 91 is adapted, when the toast-holder 23 is depressed, to engage with and downwardly flex the upper reach of a flexible contact-carrier 92, which at its lower end is rigidly attached to but insulated from a bracket 93 forming a feature of the front plate 11. The contact-carrier 92 carries on the underface of its free end a contact 94 which is adapted to engage with a complemental contact 95 secured to the upper face of the free end of a second spring-like contact-carrier 96, as is indicated in Figs. 2 and 8. Like the contact-carrier 92, the contact-carrier 96 is rigidly attached to but insulated from the bracket 93 before referred to.

The contact-carrier 92 and, hence, the contact 94, is connected by means of a wire 97 to the end of the arm 82 of the retarding-member 81. The companion or complemental arm 83 of the said retarding-member is connected by means of a wire 98 to one end of the energizing-coil 41, as is best indicated in Fig. 8. The wire 98 just referred to may be formed integral with the said energizing-coil, if desired. The opposite end of the energizing-coil 41 is connected by means of a wire 99 to one terminal of each of the three heating-coils 19, 20 and 21. The opposite terminals of the said heating-coils are jointly connected by means of a wire 100 to a line-wire 101, which latter, in conjunction with a complemental line-wire 102, leads from any suitable source of alternating current, such for instance as 60-cycle 115-volt alternating current. The line-wire 102 is connected by means of a wire 103 to the contact-carrier 96 and, hence, to the contact 95 of the latter. Thus, the switch (formed by the contacts 94 and 95), the energizing-coil 41, retarding-member 81 and the heating-coils are in series.

*Operation*

For the purpose of making clear the operation of the particular electrically-heated and electrically-timed automatic toaster shown in the accompanying drawings, let it be assumed that the toaster is cold and that it is desired to start it in operation.

Under the circumstances above described, the toast-holder 23 may be depressed by means of the finger-piece 27 thereof until the latching-hook 28 thereof is engaged with the latching-hook 29 of the latching-lever. The described downward movement of the toast-holder 23 will also depress the actuating-lever 36 of the timing-device into substantially the position in which it is shown by full lines in Fig. 3, and also cause the roller 91 carried by the said toast-holder to flex the contact-carrier 92 so as to engage the contact 94 thereof with the contact 95. This will complete a series electrical circuit through the retarding-member 81, through the energizing-coil 41 of the synchronous-electric motor 39 and thence through the heating-coils 19, 20 and 21. As thus constructed and arranged, the current flowing through the heating-coils 19, 20 and 21 must also flow through the retarding-member 81 and the energizing-coil 41, since the said elements are in series.

By way of example, it may be assumed that the resistance of the circuit through the two arms 82 and 83 of the retarding-member 81 meets with a resistance of about 0.041 ohm; similarly, let it be assumed that the resistance of the energizing-coil 41 is 0.012 ohm. Thus, assuming that the resistance offered by the heating-coils 19, 20 and 21 to passage of current between the wires 99 and 100 is about 10.447 ohms, it will be apparent that the entire series circuit has a total resistance of about 10.5 ohms so that, taken either singly or together, the retarding-member 81 and the energizing-coil 41 have a resistance which is but a small percentage of the resistance offered by the heating-coils 19, 20 and 21.

Under the circumstances now being described, the retarding-member 81 will be cold and, hence, in the position in which it is shown by full lines in Fig. 3, so that the timing-device will not be able to start the timing cycle until such time as the said retarding-member has itself become heated by the passage of current directly therethrough.

The passage of current through the heat-distortable retarding-member 81 will heat the same and cause it to ultimately flex into the retired position in which it is indicated by broken lines in Fig. 3 to thereby remove its retarding-plate 79 out of the path of movement of the retarding-face of the retarding-disk 77. This retirement, however, will not be so far completed as to free the timing-device until the heating-coils 19, 20 and 21 and the adjacent portions of the toaster have reached their normal operating temperatures.

As soon as the retarding-member 81 has retired, the synchronous-electric motor 39 or its equivalent will be free to start the timing cycle which it will now do. The timing cycle will endure until such time as the timing-rack 67 has moved in a clockwise direction sufficiently to disengage its teeth from the timing-pinion 66. When the latter action occurs, the actuating-lever 36 will snap upwardly and engage its actuating-roller 35 with the underface of the inclined releasing-flange 34 of the latching-lever 30, to swing the latter in a counterclockwise direction. The counterclockwise swinging movement of the latching-lever 30 will cause the retirement of its latching-hook 29 out of engagement with the latching-hook 28 of the toast-holder 23, thereby releasing the said toast-holder and the parts carried thereby for upward movement under the urge of the elevating-spring 24. The upward movement of the toast-holder 23 will also retire the roller 91 carried thereby and permit the inherent tension of the contact-carrier 92 to assert itself and separate the upper contact 94 from the lower contact 95.

The separation of the contacts as just above described, will effect the simultaneous cessation of current supply to the energizing coil 41 of the synchronous-electric motor 39, the arms 82 and 83 of the retarding-member 81 and the heating-coils 19, 20 and 21.

Usually in the use of a toaster, it will be utilized for a second time almost immediately, so that normally the timing-element will not have time to cool and, hence, the synchronous-electric motor 39 will be able to function the timing-device promptly for the next succeeding cycle. Should, however, the entire toaster cool down from a period of idleness, the heat-distortable retarding-member 81 will reassume the position in which it is shown by full lines in Figs. 3 and 8 and thereby preclude the operation of the timing-device, in its effort to ultimately break the circuit, until such time as the said retarding-member has again become heated and, hence, also the heating-coils 19, 20 and 21 have also become heated to function in a normal manner.

The responsiveness of the retarding-member 81 or its equivalent to heat is preferably so proportioned as to not flex into its full-clearance position (broken line position indicated in Fig. 3) until such time as the heating-coils 19, 20 and 21 and the adjacent parts of the toaster have also become fully heated to normal operating temperatures. In this manner, the toaster or its equivalent is caused to function from a cold condition in substantially the same way it will function for each cycle subsequent to its initial cycle to thus produce a uniform toast or the like.

By passing current directly through the heat-distortable retarding-member in order for such current to reach the heating-coils (and in the present instance also in order to reach the energizing-coil 41), separate heating-coils for a thermostatic element are not required and the said retarding-member may be mounted directly to the timing-device to operate directly thereon, without requiring the complex and troublesome linkages and the separate heating-coils previously employed.

The point at which the retarding-member 81 will flex sufficiently to disengage from the retarding-disk 77, may be adjusted by swinging the adjusting-member 86 about its stud 87 and locking it in a chosen position by means of the clamping-screw 89.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. An electrically-heated and electrically-timed automatic toaster or the like, including in combination: a food-holder; electric heating-means located adjacent the said food-holder for heating the contents thereof; an electric switch controlling the supply of current to the said electric heating-means; a unitary timing-device for controlling the said electric switch and including a frame, a synchronous electric motor carried by the said frame; actuating-means for the said electric switch and also carried by the said frame, a gear-train operatively connecting the said synchronous electric motor to the said actuating-means, a movable adjusting-member carried by the said frame adjacent the said gear-train, and a heat-distortable retarding-member carried by the said adjusting-member and movable therewith as well as with respect thereto and constructed and arranged when cool to engage with the said gear-train to retard the movement thereof against the urge of the said motor and when heated to distort and retire out of retarding relationship with respect to the said gear-train, the said movable adjusting-member being movable with respect to the gear-train to selectively determine the temperature at which the said heat-distortable retarding-member will retire out of engagement with the said gear-train; and electrical connecting-means connecting the said synchronous electric motor and the said heat-distortable retarding-member in series.

2. An electrically-heated and electrically-timed automatic toaster or the like, including in combination: a food-holder; electric heating-means located adjacent the said food-holder for heating the contents thereof; an electric switch controlling the supply of current to the said electric heating-means; a unitary timing-device for controlling the said electric switch and including a frame, a synchronous electric motor carried by the said frame; actuating-means for the said electric switch and also carried by the said frame, a gear-train operatively connecting the said synchronous electric motor to the said actuating-means, a movable adjusting-member pivoted to the said frame adjacent the said gear-train, and a heat-distortable retarding-member carried by the said adjusting-member and swingable therewith as well as with respect thereto and constructed and arranged when cool to engage with the said gear-train to retard the movement thereof against the urge of the said motor and when heated to distort and retire out of retarding relationship with respect to the said gear-train, the said movable adjusting-member being swingable with respect to the gear-train to selectively determine the temperature at which the said heat-distortable retarding-member will retire out of engagement with the said gear-train; and electrical connecting-means connecting the said synchronous electric motor and the said heat-distortable retarding-member in series.

ARTHUR B. POOLE.
PETER H. MORGANSON.

REFERENCES CITED

The following references are of record in the file of this patent:

UNITED STATES PATENTS

| Number | Name | Date |
|---|---|---|
| 1,738,328 | Spielman | Dec. 3, 1929 |
| 2,182,124 | Guerra | Dec. 5, 1939 |
| 2,194,859 | Malmquist et al. | Mar. 26, 1940 |
| 2,221,863 | Crane | Nov. 19, 1940 |
| 2,266,014 | Erickson | Dec. 16, 1941 |
| 2,307,347 | Anderson | Jan. 5, 1943 |
| 2,337,124 | Olving | Dec. 21, 1943 |
| 2,359,580 | Poole | Oct. 3, 1944 |
| 2,361,078 | Anderson | Oct. 24, 1944 |
| 2,412,727 | Gomersall et al. | Dec. 17, 1946 |